(12) United States Patent
Sathav

(10) Patent No.: US 8,542,981 B2
(45) Date of Patent: Sep. 24, 2013

(54) MANUAL VOICE ANNOTATIONS FOR CCTV REPORTING AND INVESTIGATION

(75) Inventor: Vasanth Sathav, TamilNadu (IN)

(73) Assignee: Honeywell International Inc., Morristown, NJ (US)

( * ) Notice: Subject to any disclaimer, the term of this patent is extended or adjusted under 35 U.S.C. 154(b) by 1138 days.

(21) Appl. No.: 12/123,946

(22) Filed: May 20, 2008

(65) Prior Publication Data

US 2009/0290847 A1 Nov. 26, 2009

(51) Int. Cl.
*G11B 27/00* (2006.01)

(52) U.S. Cl.
USPC ........... 386/279; 386/241; 386/282; 386/285; 386/287

(58) Field of Classification Search
USPC ................ 386/279, 282, 285, 287; 348/13
See application file for complete search history.

(56) References Cited

U.S. PATENT DOCUMENTS

| | | | |
|---|---|---|---|
| 6,037,977 A | | 3/2000 | Peterson |
| 2002/0051119 A1* | | 5/2002 | Sherman et al. ................... 352/1 |
| 2002/0082480 A1 | | 6/2002 | Riff et al. |
| 2004/0223054 A1* | | 11/2004 | Rotholtz ........................ 348/143 |
| 2005/0078195 A1* | | 4/2005 | VanWagner ................ 348/231.3 |
| 2006/0256739 A1* | | 11/2006 | Seier et al. ..................... 370/261 |
| 2008/0028023 A1* | | 1/2008 | Locke ........................... 709/203 |
| 2009/0067586 A1* | | 3/2009 | Fano et al. ....................... 379/49 |
| 2009/0251311 A1* | | 10/2009 | Smith et al. ............. 340/539.13 |
| 2010/0007731 A1* | | 1/2010 | Joseph et al. ................. 348/143 |
| 2011/0019871 A1* | | 1/2011 | Loos et al. ..................... 382/100 |

* cited by examiner

*Primary Examiner* — Jeffrey Pwu
*Assistant Examiner* — Thomas C Lauzon
(74) *Attorney, Agent, or Firm* — Husch Blackwell

(57) ABSTRACT

The present invention provides systems and methods for adding voice annotations to CCTV video to aid in incident reporting and investigation. Reviewers and investigators are provided with the ability to record their impressions of an incident by encoding overlapped audio tracks on to a video clip. These overlapped tracks could be multiple in number, enabled or disabled by the listener or subsequent reviewer, without tampering with the content of the originally recorded video or audio. Each audio track represents a voice annotation, and may be assigned to a hierarchical level. The reviewer is provided with the ability to review the video clip along with existing voice annotations while recording the new voice annotation. The resultant overlapped clip file could be made proprietary or stored using a common-codec (like MPEG, MJPEG, AVI, etc) and may be stored on a computer-readable medium.

16 Claims, 3 Drawing Sheets

MANUAL VOICE ANNOTATIONS FOR CCTV REPORTING AND INVESTIGATION

FIELD OF THE INVENTION

The present invention relates to CCTV security systems. Specifically, the present invention relates to creating voice annotations corresponding to CCTV footage of an incident to assist investigation of the incident.

BACKGROUND OF THE INVENTION

Closed-Circuit Television (CCTV) security systems are commonplace, and are becoming increasingly prevalent as CCTV technology advances. In particular, Digital CCTV integrates security systems over networks and allows for video recorded by CCTV cameras to be archived and shared with a plurality of users.

CCTV video footage is used for a variety of purposes. CCTV cameras may be placed in situations where a human observer is unable to monitor what is happening. For instance, CCTV cameras can be set up in environments with extreme temperatures or noxious fumes. A digital network-enabled CCTV camera can further upload video footage to a central server so a human would only have to perform the most basic maintenance, if any. However, the most prevalent use of CCTV cameras is for security systems, specifically, to minimize losses attributed to thefts and other crimes.

Although CCTV systems may be used to deter crime, their main advantage stems from being able to monitor criminal activity such that the suspects can be apprehended immediately or soon after. Video and potentially audio from a CCTV camera is recorded and stored on a storage medium such as a hard drive on a computer or remote network drive. Upon the suspicion of or discovery that a crime has taken place, an investigator can search through the stored video and audio. When the investigator finds relevant portions of footage that may contain details helpful to the investigative process, he may export that portion of the recording to a separate file on a storage unit such as USB flash disk, CD, DVD, etc. This collection of relevant footage can be termed a "clip." This clip is useful as evidence, and may be reviewed multiple times by a plurality of investigators to catch details and other information related to the incident.

However, the reviewing and investigative process as it works today is deficient in many ways. Generally, the investigation process itself is a sequence of hierarchical inquiry and analysis processes, whereby at each stage the corresponding investigator analyzes the clip recordings and looks for the macro and micro details of the incident. The investigator can range anywhere from first-level CCTV Surveillance operator to a top-level investigative or law enforcement officer. Typically, the investigator reviewing the clip has to take notes recording his impressions of what is going on. Alternatively, he orally communicates the details of the scene, or his general impressions, to the next level investigator. This system in itself is prone to forgetting details, or being unable to appropriately synthesize the impressions of two or more investigators. The record of impressions or annotations becomes a jumbled mess of notes that are not optimally linked or saved with the video clip of the incident. Where an incident has to be re-reported and escalated to multiple persons and levels, details and observations of the incident may be miscommunicated. Even if there are no human errors, there exists the frustration of repetitive communications. Consequently, the crime investigation becomes a difficult task, necessitating repeated simple inquiries that are otherwise avoidable.

What is needed is a method and system to effectively annotate a CCTV video clip for improved investigation of an incident.

SUMMARY OF THE INVENTION

The present invention provides multiple investigators with the ability to record their impressions of an incident by encoding overlapped audio tracks onto a video clip. These overlapped tracks could be multiple in number, enabled or disabled by the listener or subsequent reviewer, without tampering with the content of the originally recorded video or audio. The resultant overlapped clip file could be made proprietary or stored using a common-codec (like MPEG, MJPEG, AVI, etc). Thus, the limitations in annotating video clips mentioned above are overcome.

In one exemplary embodiment, the present invention is a method for annotating a video recording of an incident, comprising: reviewing recorded video footage of an incident, recording a first voice annotation from a reviewer describing events occurring in the recorded video footage of the incident, overlaying the first voice annotation over the recorded video footage, such that the first voice annotation is synchronized with the events occurring in the recorded video footage of the incident, recording a second voice annotation from a second reviewer while playing back the recorded video footage in synchronization with the first voice annotation, and playing back the recorded video footage in synchronization with one or both voice annotations. The recorded video footage may be stored on a computer-readable medium.

In a related embodiment, this method further comprises creating a video clip comprising a selected plurality of portions of the recorded video footage, recording the first voice annotation describing events occurring in the video clip, overlaying the first voice annotation over the video clip, such that the first voice annotation is synchronized with the events occurring in the video clip, recording the second voice annotation from the second reviewer while playing back the video clip in synchronization with the first voice annotation, overlaying the second voice annotation over the video clip, such that the second voice annotation is synchronized with the events occurring in the video clip as well as with the first voice annotation, and storing the video clip along with the overlaid first voice annotation on a computer-readable medium.

Further, the video clip along with the first voice annotation may be submitted to a plurality of reviewers. This involves overlaying a plurality of voice annotations from a plurality of reviewers over the video clip while playing back the video clip in synchronization with any combination of existing voice annotations, such that the plurality of voice annotations is synchronized with events occurring in the video clip, and selecting any combination of the plurality of voice annotations to be played back in synchronization with the video clip. This selection of any combination of the voice annotations may be performed via a user interface on a computer terminal.

A related embodiment further comprises assigning a hierarchy to each of the plurality of voice annotations, and selectively playing back the video clip in synchronization with one or more of the plurality of voice annotations within a specific hierarchy.

The recorded video footage or the video clip may be stored in the MPEG, MJPEG, AVI, or an equivalent open-source or proprietar file format. The plurality of voice annotations within the video clip can further be embedded into the video clip as a plurality of audio tracks that can be selectively muted or activated by a reviewer. Alternatively, the plurality of voice annotations may be stored as a plurality of separate audio files that are cross-referenced to each other and to the video. The video footage and corresponding voice annotations may be encrypted using any proprietary encrypting mechanism. To ensure authenticity, each voice annotation may be digitally signed using a unique digital signature for each corresponding reviewer.

In another embodiment, the present invention is a method for providing Hierarchical Embedded Investigation Accounts (HEIA), the method comprising: recording video footage of an incident, said video footage being recorded by a CCTV camera, storing the video footage on a first storage medium, retrieving the stored video footage and adding a portion of the video footage that is relevant to an investigation of the incident into a video clip, storing the video clip on a second storage medium, recording a first voice annotation from a first reviewer of the video clip describing events occurring in the video clip, said first voice annotation being encoded over the video clip such that the first voice annotation can be played back in synchronization with the video clip, recording a second voice annotation from a second reviewer of the video clip describing events occurring in the video clip, said second voice annotation being recorded while reviewing the video clip in synchronization with the first voice annotation, and playing back the video clip with a choice of muting or unmuting either of the first and second voice annotations.

The video clip with the first and second voice annotations may be stored on a storage medium and provided to a plurality of subsequent reviewers of the video clip, said subsequent reviewers being able to record a plurality of subsequent voice annotations describing the incident, said plurality of subsequent voice annotations being recorded while reviewing the video clip in synchronization with either or both of the first, second, and any existing voice annotations, and then played back with a choice of muting or unmuting any combination of the first, second, and plurality of subsequent voice annotations in synchronization with the video clip.

A related embodiment involves assigning a hierarchy to each of the plurality of voice annotations, and selectively playing back the video clip in synchronization with one or more voice annotations within a specific hierarchy. The ability to selectively mute either of the voice annotations may be provided via a user interface on a computer terminal. The recorded video footage or the video clip may further be stored in MPEG, MJPEG, AVI, or an equivalent open-source or proprietary file format, and encrypted using any proprietary encrypting mechanism.

In another embodiment, the present invention describes a system for annotating a video recording of an incident, the system comprising: a CCTV camera that records video footage of an incident, a first storage unit for storing the recorded video footage, editing means for creating a video clip comprising a plurality of portions of the recorded video footage, recording means for recording a first voice annotation describing events occurring in the video clip while reviewing said video clip, a means for overlaying the first voice annotation over the video clip, such that the first voice annotation is synchronized with the events occurring in the video clip, playback means for playing back the video cilp in synchronization with the first voice annotation, recording means for recording and overlaying a second voice annotation from a second reviewer over the video clip while playing back the video clip with the first voice annotation, such that the second voice annotation is synchronized with the video clip and the first voice annotation, and playback means for playing back the video clip together in synchronization with one or both of the first and second voice annotations.

The video clip along with the overlaid first voice annotation may be submitted to a plurality of subsequent reviewers, making use of a means for overlaying a plurality of voice annotations from the plurality of reviewers over the video clip while playing back the video clip with the first, second, or any existing voice annotations, such that the plurality of voice annotations is synchronized with events occurring in the video clip as well said existing voice annotations, and playback means for playing back the video clip together in synchronization with any combination of the plurality of voice annotations. To ensure authenticity, each voice annotation may be digitally signed using a unique digital signature for each corresponding reviewer.

In yet another embodiment, the present invention describes a security system for reporting incidents recorded with a CCTV camera and using Hierarchical Embedded Investigation Accounts (HEIA), the system comprising: a video clip of an incident recorded by a security camera, a storage unit to store the video clip, logic that enables a plurality of users to play back the video clip and to record a plurality of Hierarchical Embedded Investigation Accounts (HEIA), each HEIA being a voice annotation describing the incident, said HEIAs further being overlaid over the video recording as a plurality of audio tracks in synchronization with the video clip, and logic that enables a user to select one or more of the plurality of HEIAs in any combination to be played back along with the video clip while recording a subsequent HEIA.

BRIEF DESCRIPTIONS OF THE DRAWINGS

DETAILED DESCRIPTION OF THE INVENTION

The present invention assists the investigative process by providing means to store voice or annotation of recorded footage along with the footage in a digital CCTV surveillance system. This voice annotation may be stored as an add-on plug-in, overlaid over the video recordings. Commentary on the progress of the video describes the scene and non-obvious details of the incident. The most relevant person to record such voice annotations would be the CCTV operator who may have observed the incident. Additionally, there may be multiple voice annotation tracks (from multiple security operators), recorded and played as per the choice of the reviewer of the video, possibly a police investigator. Voice annotations could be muted and unmuted based on their relevance to the video, their hierarchy, or any factors affecting the investigator's choice. This voice annotation recording may be performed on duplicate copies of the video recording without tampering with the original authentic video recording. Video files having voice annotations could further be digitally signed for authenticity of commentary.

Figure 1:
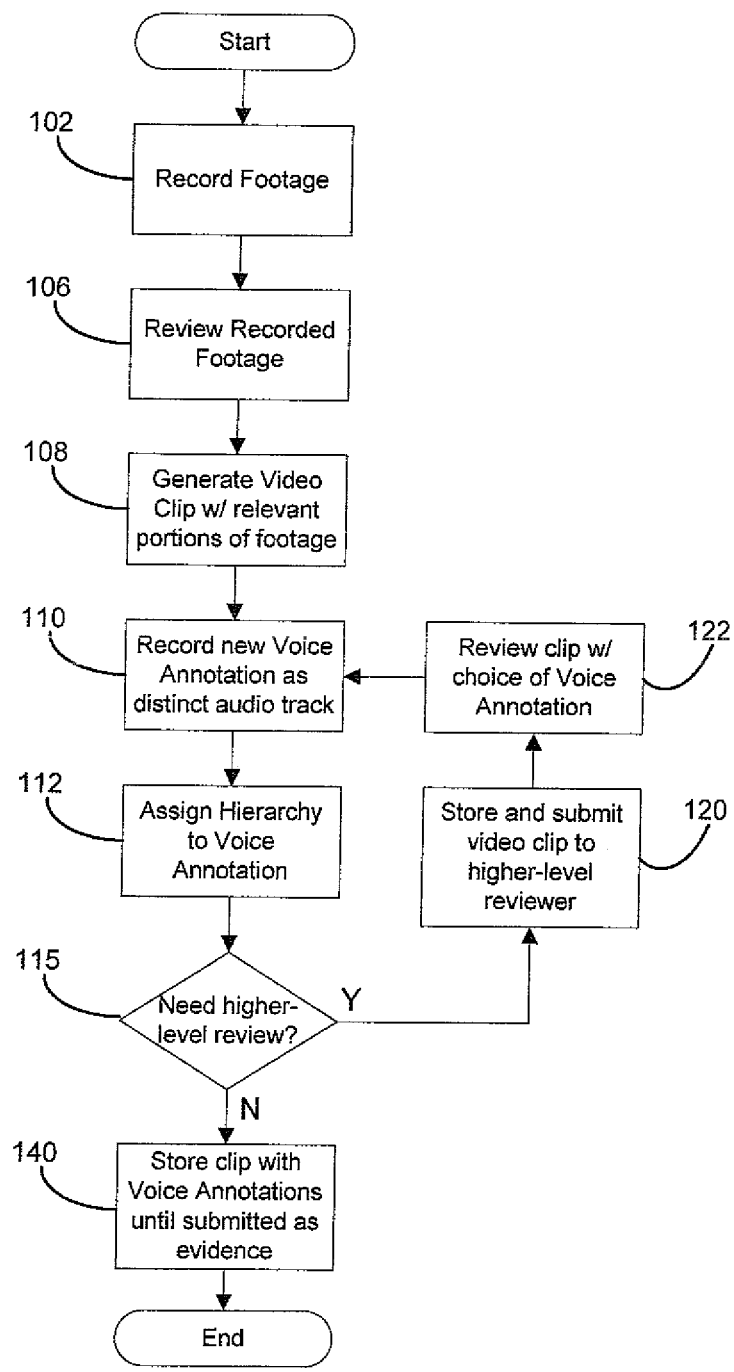
FIG. 1 shows a flow diagram showing the steps involved in adding voice annotations to a video recording, according to an exemplary embodiment of the present invention.

FIG. 1 shows a flow diagram showing the steps involved in adding voice annotations to a video recording, according to an exemplary embodiment of the present invention. In step 102, video footage is recorded. The video footage may comprise details related to an incident such as a crime or an accident, but this is not necessary. The video footage may be recorded by any type of security camera known in the art. In one embodiment, the video footage is recorded by a CCTV camera. The CCTV camera may be a digital device that may or may not have its own storage unit. A digital CCTV camera would be coupled to a computer so as to store the recorded footage. The computer may further be coupled to a network to transmit the footage to relevant parties. Alternatively, the CCTV camera may be an IP camera, having its own networking functionality. In another embodiment, the camera is a motion-sensing camera. In either case, the camera records footage, either at discrete time intervals, or over a period of time. In the case of the motion-sensing camera, video footage may only be recorded when the CCD or sensor of the camera detects movement. The video footage is stored on a server, either locally (within the vicinity of the secured area) or on a remote server that is network accessible and part of the security network.

In step 106, the recorded footage is reviewed for its relevance or usefulness in investigating an incident. This step may be triggered by the happening of an event, such as a crime or an accident. For instance, a valuable artifact goes missing, and the next day alarm bells are rung. The museum security protocol may provide for an immediate review of the past X hours of recorded footage from all the cameras. This is the preliminary part of the investigation: where a reviewer sifts through all the video footage, and extracts any portion of the footage that he thinks may be relevant to the investigation. In the present example, the CCTV operator of the museum may browse through footage recorded from a plurality of cameras in different locations. The purpose is to generate a compilation of relevant or potentially relevant footage into a single video clip. This happens in step 108.

The process 108 of generating a video clip out of a plurality of portions of video footage is known in the art. For instance, the investigator or CCTV operator may select "start" and "end" points from a portion of video footage, and export that part into a separate file stored in local memory. Every additional relevant portion is appended to this separate file. Finally, the separate file can be stored independently as an evidentiary video clip, which will be referred to and/or reviewed when needed during the investigation.

Once the video clip is assembled and saved onto a storage medium, it can be reviewed by an investigator, who will record his or her impressions of the events in the video clip in step 110. Where in the prior art an investigator would write down, or verbally communicate his findings and impressions to the next reviewer, the present invention provides means to record a voice annotation over the video clip. This voice annotation can be recorded while the investigator is watching the video clip, and is stored as a separate audio track in synchronization with the video clip. In the present example, either the CCTV operator or a preliminary investigator or any similar person reviews the clip, probably on a computer terminal, and uses a software interface provided by the present invention to record his impressions. This investigator is able to rewind and replay portions of the clip, zoom in and out, enhance details, and perform other similar tasks, all while at the same time speaking aloud his impressions of what is going on. This voice annotation is being recorded in synchronization with the video clip, such that rewinding and playing back a portion of the clip also changes the time marker on the corresponding vocal annotation.

The investigator may record one or more voice annotations for the video clip. Generally, the investigator is trying to communicate many features about the video clip, for instance, description of certain complex scenes of the recording, his opinion or report about the scene, and potential areas to concentrate subsequent investigative steps. These may be recorded in one annotation, or a layer of annotations that may be categorized according to the type of analysis being provided by the investigator. Furthermore, each voice annotation by a specific reviewer may be digitally signed to ensure authenticity of the annotation. Each reviewer may have a unique digital signature. Any form of digitally signing a file known in the art may be used.

The present invention also provide for categorization of voice annotations. Voice annotations can be categorized based on the rank of the investigator, stage in the investigation, and type of analysis (observations, patterns, recommendations, etc). In one embodiment, each voice annotation is assigned to a hierarchy in step 112. This hierarchy reflects the point in the investigation that the voice annotation was made. In the present example, the preliminary investigator may record one or more voice annotations, all of which would be assigned to a lower hierarchical level than the subsequent investigator, who may be a more senior officer. Further, as an evidentiary video clip is passed to different law enforcement departments, assorted hierarchies may be assigned.

Depending on what stage the investigation is in, the video clip may be passed to another reviewer for annotation. If such a higher level review is needed, then this video clip along with preliminary voice annotations may be stored on a storage medium such as a hard drive, network drive, or portable storage like USB, memory card, CD, etc., and handed to another reviewer, in step 120. In step 122, the subsequent reviewer can play back the video clip with his choice of voice annotation. Thus, the subsequent reviewer is able to not only review the clip based on what he sees on the screen, but also based on what he is alerted to from the prior reviewers' voice annotations. The ability to play back a video clip and select which voice annotations are to be played back may be provided via a user interface on a computer. An exemplary user interface is described in FIG. 3.

As in steps 110-112, the subsequent reviewer's voice annotation is recorded and stored as a distinct audio track, either embedded into the video clip or stored as a separate audio file that is cross linked to the video clip, such that playback of both video and audio is synchronized. Further, the subsequent reviewer's annotations may be assigned to a hierarchy depending on the reviewer's rank, stage in the investigation, as well as content of the voice annotation. In the present instance, the preliminary reviewer may have submitted the video clip along with his voice annotation to the local precinct where a junior investigator has to investigate the case. The junior investigator plays back the video clip (stored either on a network drive or some form of portable storage) on his computer via a proprietary software interface, and is able to selectively mute or unmute the preliminary investigator's voice annotations (step 122). The junior investigator looks for details in the video footage recorded by the CCTV cameras in the museum, and synthesizes his impressions with those of the preliminary investigator. These new voice annotations are recorded as separate audio tracks, and depending on whether or not subsequent review is needed (step 115), the package comprising video clip and vocal annotations can be submitted to the next level of investigation.

The loop 110-122 can be thought of as a method for appending a plurality of voice annotations on the video as separate tracks, while providing the ability to review the video clip with a reviewer's choice of which annotations he wants to listen to. The final product is a video clip file having a plurality of voice annotations describing events related to the incident. If the investigative chain is complete, or put on hold while other portions of the investigation are pending, the clip is stored as evidence along with the voice annotations (step 140) until it is needed. The clip+annotations may be encrypted using a proprietary encoding mechanism such that the integrity of the evidence is maintained.

Figure 2:
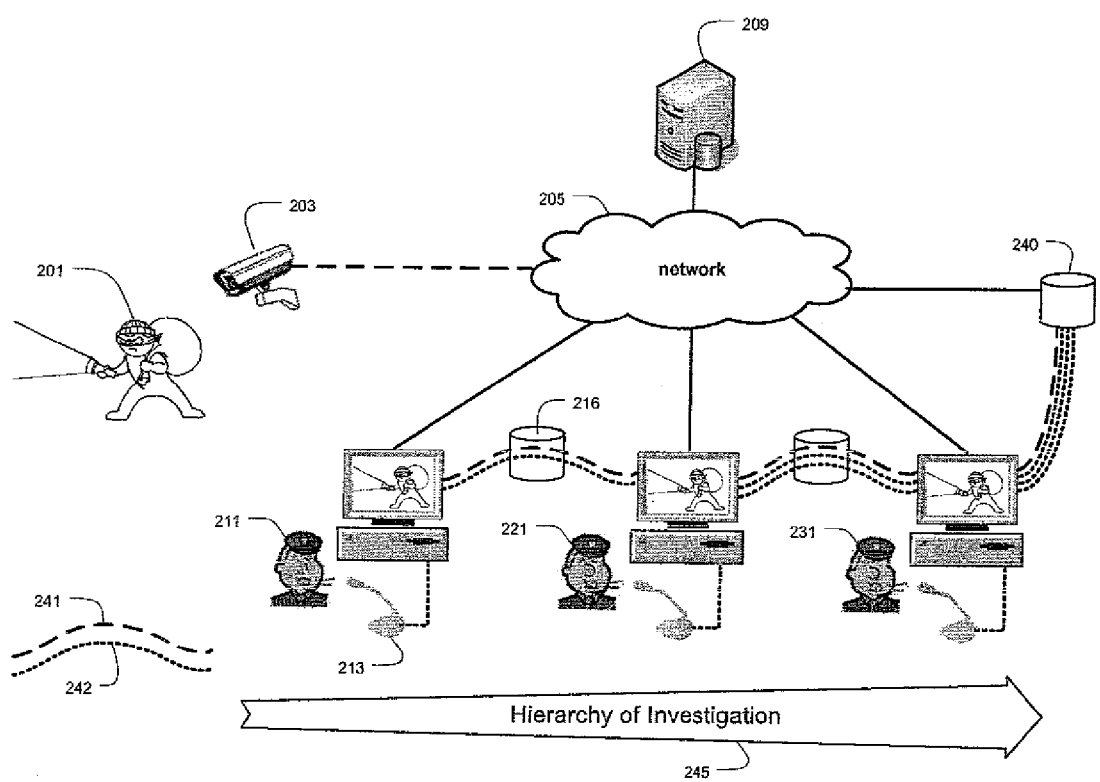
FIG. 2 shows a plurality of investigators providing voice annotations for a video clip of an incident, according to an exemplary embodiment of the present invention.

FIG. 2 shows a system for recording voice annotations describing a recorded incident, according to an exemplary embodiment of the present invention. A thief 201 has just stolen a valuable artifact from a secure area monitored by CCTV camera 203. Camera 203 records video footage and transmits it via a network to central server 209 that also comprises a storage unit. Alternatively, camera 203 may have its own local storage. The dashed line 241 represents video data being transmitted. This video data may also comprise audio recorded at the incident. On the other hand, dotted lines 242 represent subsequently recorded audio data in the form of voice annotations. Network 205 also provides communication between investigators 211, 221, and 231 and their respective terminals. Further, investigators 211, 221, and 231 may have their own local storage units 216, and are in communication with not only central server 209 but also remote storage unit 240. Storage unit 216 may be any local or portable storage device and is used to transfer video+annotations to the next investigator. The arrow 245 is intended to represent hierarchy of investigation that increases with the thickness of the arrow.

When the incident is detected, a video clip may be compiled by a CCTV operator, a preliminary investigator, or investigator 211. The video clip may comprise portions from a plurality of cameras, or just a single camera 203. At the bottom of the hierarchical level (left end of arrow 245), investigator 211 reviews the video clip on his computer. Investigator 211 records his voice annotation via microphone 213, or via any means known in the art for digitizing audio data and storing on a computer. When investigator 211 completes his reporting, he may store the video clip (represented by dashed line) along with the annotation (represented by dotted line) on a storage medium 216. Storage 216 may be portable so as to allow transfer of the clip to second investigator 221. Investigator 221 reviews the video clip, optionally along with the first voice annotation recorded by investigator 211. Investigator 221 adds his impressions again being stored as a separate audio file, represented by another dotted line. The video clip+two annotations can be stored again on a storage medium, and/or transferred to a subsequent investigator 231 who may be at a higher hierarchical level as represented by broad end of arrow 245. Investigator 231 reviews the annotations provided by investigators 211 and 221, and adds his own impressions to the video clip.

At this point, there may or may not be further review necessary. While the decision is pending, or when it is decided that the video clip+3 annotations constitutes sufficient evidence to present to some adjudicating authority like a court of law, or to get a warrant for arrest, the video clip+annotations is stored on remote storage 240. Remote storage 240 may be a network drive or some sort of external storage like a CD or DVD and is stored safely. The video clip+annotations may be encrypted to preserve the authenticity of the evidence.

A key component here is the ability to play back a selection of voice annotations so as to get differing impressions on the video clip. Annotations may be played back by selecting them individually, or by selecting groups of annotations based on their hierarchy or other factors. This ability can be provided via the user interface described in FIG. 3.

Figure 3:
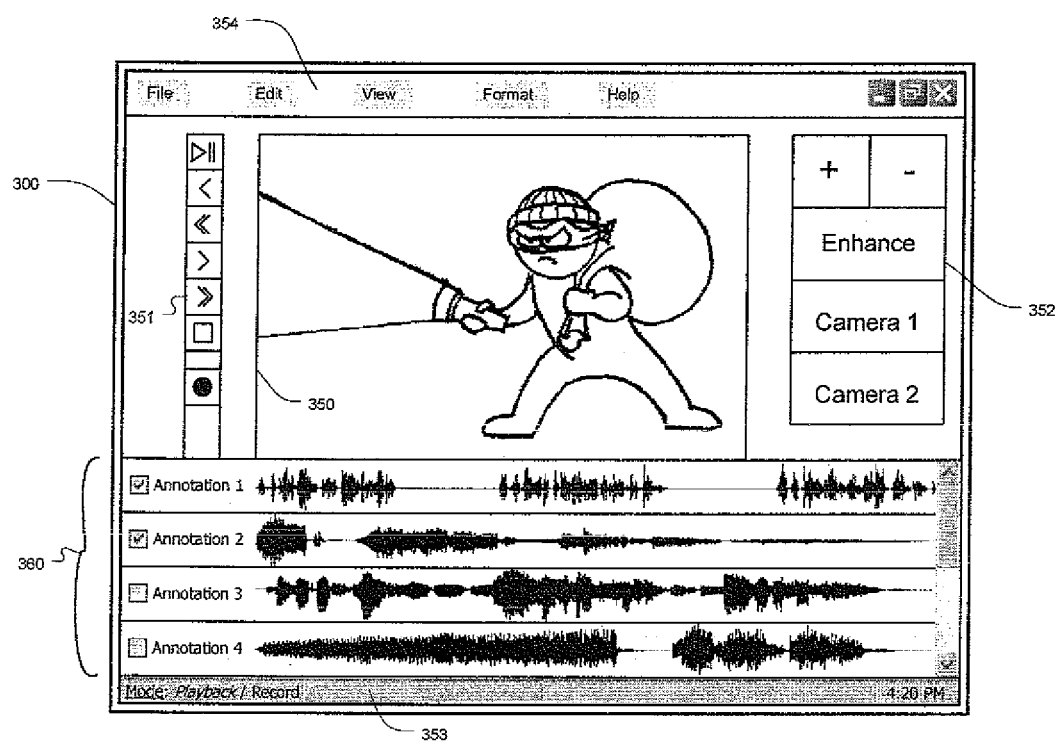
FIG. 3 shows a user interface for recording and playing back a video clip having multiple voice annotations, according to an exemplary embodiment of the present invention.

FIG. 3 shows a user interface 300 for recording and playing back a video clip having multiple voice annotations, according to an exemplary embodiment of the present invention. Interface 300 has a video portion 350 that shows the video clip on a size-adjustable window. Control panel 351 provides playback controls including slow/fast and recording controls. Toolbox 352 provides other options, such as zoom, enhance, and related options that are standard in digital CCTV monitoring. There may also be an option to view footage from multiple camera angles. Status bar 353 shows details and provides messages related to current configuration. Menu bar 354 provides other options related to opening new files, and exporting existing files, as well as various configuration options.

Notably, there is a section 360 showing the various playable audio tracks associated with the video clip. These audio tracks comprise voice annotations that have been recorded by a plurality of investigators. As can be seen in FIG. 3, annotations 1 and 2 have been selected for current playback, while annotations 3 and 4 are currently muted. Further, annotations can be selectively played back or muted based on other attributes that they may have, such as hierarchy, etc. It should be noted that this software interface is merely exemplary, and other configurations and options can be provided and will be evident to one skilled in the art.

While preferred embodiments of the present invention have been described using specific terms, such description is for illustrative purposes only, and it is to be understood that changes and variations may be made without departing from the spirit or scope of the following claims.

The invention claimed is:

1. A method for annotating a video recording of an incident, comprising:
   a closed circuit television (CCTV) camera monitoring a secure area;
   a plurality of investigators investigating a crime or accident in the secure area by reviewing recorded video footage from the CCTV camera of the crime or accident in the secure area;
   recording a first voice annotation from a first investigator of the plurality of investigators describing events occurring in the recorded video footage of the crime or accident;
   overlaying the first voice annotation over the recorded video footage, such that the first voice annotation is synchronized with the events occurring in the recorded video footage of the incident;
   recording at least a second voice annotation from a respective at least second investigator of the plurality of investigators investigating the crime or accident while playing back the recorded video footage in synchronization with the first voice annotation;
   overlaying the second voice annotation over the recorded video footage and first annotation, such that the second voice annotation is synchronized with the events occurring in the recorded video footage of the incident;
   assigning the first and at least second voice annotation to a hierarchy based upon at least one of a reviewer's rank, a stage in the investigation and a content of the annotation; and
   playing back the first and at least second voice annotations in accordance with the hierarchy where each of the first and at least second voice annotations in the hierarchy are played back individually in synchronism with the recorded video footage.

2. The method of claim 1, further comprising: storing the recorded video footage on a computer-readable medium.

3. The method of claim 2, further comprising: creating a video clip, said video clip comprising a selected plurality of portions of the recorded video footage;

recording the first voice annotation describing events occurring in the video clip;

overlaying the first voice annotation over the video clip, such that the first voice annotation is synchronized with the events occurring in the video clip;

recording the second voice annotation from the second investigator while playing back the video clip in synchronization with the first voice annotation;

overlaying the second voice annotation over the video clip, such that the second voice annotation is synchronized with the events occurring in the video clip as well as with the first voice annotation;

storing the video clip along with the overlaid first and second voice annotations on a computer-readable medium; and playing back the recorded video footage in synchronization with one or both voice annotations.

4. The method of claim 3, further comprising: overlaying a plurality of voice annotations from a plurality of reviewers over the video clip while playing back the video clip in synchronization with any combination of existing voice annotations, such that the plurality of voice annotations is synchronized with events occurring in the video clip as well as said existing voice annotations; and selecting any combination of the plurality of voice annotations to be played back in synchronization with the video clip.

5. The method of claim 4, wherein selection of any combination of the voice annotations is performed via a user interface on a computer terminal.

6. The method of claim 4, further comprising: assigning a hierarchy to each of the plurality of voice annotations; and selectively playing back the video clip in synchronization with one or more of the plurality of voice annotations within a specific hierarchy.

7. The method of claim 4, further comprising: storing the recorded video footage or the video clip in MPEG, MJPEG, AVI, or an open-source or proprietary video file format.

8. The method of claim 7, further comprising: embedding the plurality of voice annotations within the video clip as a plurality of audio tracks that can be selectively muted or activated by a reviewer.

9. The method of claim 7, further comprising: storing the plurality of voice annotations as a plurality of separate audio files that are cross-referenced to each other and to the video.

10. The method of claim 4, further comprising digitally signing the first, second, or plurality of voice annotations using a unique digital signature for each corresponding reviewer and investigator.

11. A method for providing Hierarchical Embedded Investigation Accounts (HEIA), the method comprising:

recording video footage of a crime or accident, said video footage being recorded by a CCTV camera monitoring a secure area;

storing the video footage on a first storage medium;

retrieving the stored video footage and adding a portion of the video footage that is relevant to an investigation of the crime or accident into a video clip;

storing the video clip on a second storage medium;

recording a first voice annotation from a first investigator of a plurality of investigators investigating the crime or accident by reviewing the video clip, the recorded first voice annotation describing events occurring in the video clip, said first voice annotation being encoded over the video clip such that the first voice annotation can be played back in synchronization with the video clip;

recording at least a second voice annotation from at least a second investigator of the plurality of investigators investigating the crime or accident by reviewing the video clip, the recorded second voice annotation describing events occurring in the video clip, said second voice annotation being recorded while reviewing the video clip in synchronization with the first voice annotation;

assigning the first and at least second voice annotation to a hierarchy based upon at least one of a reviewer's rank, a stage in the investigation and a content of the annotation; and playing back the first and at least second voice annotations in accordance with the hierarchy where each of the first and at least second voice annotations in the hierarchy are played back individually in synchronism with the recorded video footage.

12. The method of claim 11, further comprising: storing the video clip along with the first and second voice annotations on the second storage medium;

providing the video clip to a plurality of subsequent reviewers of the video clip, said subsequent reviewers being able to record a plurality of subsequent voice annotations describing the crime or accident, said plurality of subsequent voice annotations being recorded while reviewing the video clip in synchronization with either or both of the first, second, and any existing voice annotations; and playing back the video clip with a choice of muting or unmuting any combination of the first, second, and plurality of subsequent voice annotations.

13. The method of claim 12, further comprising: assigning a hierarchy to each of the plurality of voice annotations; and selectively playing back the video clip in synchronization with one or more voice annotations within a specific hierarchy.

14. The method of claim 11, wherein the ability to selectively mute either of the voice annotations is provided via a user interface on a computer terminal.

15. The method of claim 11, further comprising: storing the recorded video footage or the video clip in MPEG, MJPEG, AVI, or an equivalent open-source or proprietary file format; and encrypting the recorded video footage, the video clip, and the corresponding voice annotations using any proprietary encrypting mechanism.

16. The method of claim 11, further comprising digitally signing the first, second, or plurality of voice annotations using a unique digital signature for each corresponding reviewer.

* * * * *